(12) United States Patent
Gao et al.

(10) Patent No.: US 11,339,505 B2
(45) Date of Patent: May 24, 2022

(54) METHOD FOR PREPARING GRAPHENE/NYLON-6 FIBER

(71) Applicant: HANGZHOU GAOXI TECHNOLOGY CO., LTD., Zhejiang (CN)

(72) Inventors: Chao Gao, Zhejiang (CN); Yi Han, Zhejiang (CN); Chen Chen, Zhejiang (CN)

(*) Notice: Subject to any disclaimer, the term of this patent is extended or adjusted under 35 U.S.C. 154(b) by 347 days.

(21) Appl. No.: 16/465,574

(22) PCT Filed: Feb. 8, 2018

(86) PCT No.: PCT/CN2018/075701
§ 371 (c)(1),
(2) Date: May 31, 2019

(87) PCT Pub. No.: WO2018/161766
PCT Pub. Date: Sep. 13, 2018

(65) Prior Publication Data
US 2019/0292692 A1    Sep. 26, 2019

(30) Foreign Application Priority Data

Mar. 7, 2017  (CN) .................. 201710131351.X
Mar. 7, 2017  (CN) .................. 201710131531.8
Mar. 7, 2017  (CN) .................. 201710134838.3

(51) Int. Cl.
*C08J 3/02*        (2006.01)
*C08J 3/03*        (2006.01)
(Continued)

(52) U.S. Cl.
CPC ............ *D01F 8/18* (2013.01); *C08G 69/14* (2013.01); *C08G 69/16* (2013.01); *C08K 3/042* (2017.05);
(Continued)

(58) Field of Classification Search
CPC ...... B29B 9/065; C08J 3/02; C08J 3/03; C08J 3/12; C08J 3/20; C08J 3/201; C08J 3/205;
(Continued)

(56) References Cited

U.S. PATENT DOCUMENTS

2014/0225026 A1*  8/2014  Park .................. C08K 3/042
                                                  252/77
2017/0145596 A1*  5/2017  Hays .................. A47G 9/0246

FOREIGN PATENT DOCUMENTS

CN       104562276 A  *  4/2015  ............... D01D 5/08

OTHER PUBLICATIONS

Translation of CN 104562276 A (published on Apr. 29, 2015).*
Translation of CN 106835333 A (published on Jun. 13, 2017).*

* cited by examiner

*Primary Examiner* — Leo B Tentoni (57) ABSTRACT

A high-strength high-modulus graphene/nylon-6 fiber and a preparation method thereof are provided. The fiber is obtained through processing modified graphene and caprolactam with in situ polymerization and high-speed melt spinning. A graphene/nylon-6 composite is provided, which is obtained through compositing the modified graphene, the caprolactam and an additive. Based on the composite, a graphene/nylon-6 fabric with a permanent far-infrared healthcare function and a graphene/nylon-6 fabric with an ultraviolet protective property are provided, whose far-infrared property and ultraviolet protective property will not be attenuated due to an increase of fabric washing times, having a great market potential.

7 Claims, 3 Drawing Sheets

(51) Int. Cl.
*C08J 3/12* (2006.01)
*C08J 3/20* (2006.01)
*C08J 3/205* (2006.01)
*C08J 3/21* (2006.01)
*C08J 3/215* (2006.01)
*D01F 6/60* (2006.01)
*D03D 23/00* (2006.01)
*D01F 8/18* (2006.01)
*C08K 3/04* (2006.01)
*C08G 69/14* (2006.01)
*C08K 7/06* (2006.01)
*D01D 5/08* (2006.01)
*D01F 1/10* (2006.01)
*D01F 8/12* (2006.01)
*C08G 69/16* (2006.01)
*D01F 6/90* (2006.01)
*D01D 1/04* (2006.01)
*D01F 1/07* (2006.01)
*B29B 9/06* (2006.01)

(52) U.S. Cl.
CPC ................ *C08K 7/06* (2013.01); *D01D 1/04* (2013.01); *D01D 5/08* (2013.01); *D01F 1/07* (2013.01); *D01F 1/10* (2013.01); *D01F 1/106* (2013.01); *D01F 6/90* (2013.01); *D01F 8/12* (2013.01); *B29B 9/065* (2013.01); *C08J 3/201* (2013.01); *C08J 3/2056* (2013.01); *C08J 3/212* (2013.01)

(58) Field of Classification Search
CPC ... C08J 3/2056; C08J 3/21; C08J 3/212; C08J 3/215; C08K 3/042; D01D 1/04; D01D 5/08; D01F 1/10; D01F 1/106; D01F 6/60; D01F 6/90; D03D 23/00
USPC ............. 264/103, 141, 142, 143, 210.6, 211, 264/331.19; 523/322, 340; 524/495, 524/496, 847
See application file for complete search history.

METHOD FOR PREPARING GRAPHENE/NYLON-6 FIBER

CROSS REFERENCE OF RELATED APPLICATION

This is a U.S. National Stage under 35 U.S.C 371 of the International Application PCT/CN2018/075701, filed Feb. 8, 2018, which claims priority under 35 U.S.C. 119(a-d) to CN 201710131351.X, CN 201710134838.3 and CN 201710131531.8, all filed Mar. 7, 2017.

BACKGROUND OF THE PRESENT INVENTION

Field of Invention

The present invention relates to a field of functional fiber, and more particularly to a high-strength high-modulus graphene/nylon-6 fiber and a preparation method thereof, a graphene/nylon-6 fabric with a permanent far-infrared healthcare function and a preparation method thereof, a graphene/nylon-6 fabric with a permanent ultraviolet protective property and a preparation method thereof.

Description of Related Arts

The polyamide fiber, known as nylon, is the earliest industrialized synthetic fiber in the world, which has advantages of excellent strength, abrasive resistance and elastic recovery rate, and is widely applied in industries of tire cord, industrial cloth, cable, conveyor belt and fishing net. Moreover, the polyamide fiber can also be applied in the parachute and other military fabrics in the defense filed. In the above industrial spinning fields, the high-strength and high-modulus properties of the nylon-6 are especially required. However, the pure nylon-6 is failed to meet the industrial requirements, so that the nylon-6 composite is usually adopted in the industry to increase the strength and modulus of the nylon-6. The early nylon-6 composite usually adopts the glass fiber and nano-montmorillonite for enhancement, but the effect is less and the spinnability is limited. The present invention modifies the nylon-6 with a small amount of graphene, so as to successfully prepare the high-strength high-modulus graphene/nylon-6 composite fiber.

However, whether the graphene/nylon-6 composite is able to be applied in the industrial spinning for preparation of the high-strength high-modulus composite fiber faces following two problems. The first problem is that the graphene has a two-dimensional lamellar structure. If the added graphene has a multi-layer structure, the dispersion is easily to be non-uniform and stacking happens, so that the small spinning nozzle hole will be blocked. The second problem is that the single-layer graphene is a two-dimensional nanometer material having the relatively large specific surface area, and thus the single-layer graphene has an obvious effect in increasing the viscosity of the nylon-6. If the composite melt has a high viscosity, on the one hand, the screw torque of the spinning device is increased, thereby increasing the energy consumption; on the other hand, the fluidity becomes poor and the coarse fiber cannot be obtained, causing that the graphene/nylon-6 composite cannot be applied in the industrial spinning field. Thus, even though the single-layer graphene has the excellent enhancement effect, the single-layer graphene is still not applied in the high-strength high-modulus industrial spinning field. Based on the above situation, the present invention processes the graphene/nylon-6 composite, which is prepared by the modified graphene, caprolactam and additive, with high-speed melt spinning through an industrial spinning device, so that the nylon-6 fiber, which is modified with the graphene and has the flame retardance and ultraviolet resistance, is successfully prepared.

The far infrared is a part having the wavelength of 8-15 μm in the spectrum, which is an essential element of biological survival and is also called the life wave. The far infrared is able to generate the most effective resonance with the water molecules of the biological cells and meanwhile has the permeability, which effectively facilitates the growth of the animals and plants. After being absorbed by the human body, the far infrared generates the resonance with the water molecules inside the human body, so as to activate the water molecules and increase the intermolecular binding force, thereby activating the biological macromolecules such as the protein and enabling the biological cells to be at a highest vibration level. Because the biological cells generate the resonance effect, the far-infrared thermal energy is able to be transmitted to a relatively deep part below the human skin; the body temperature increases, and the generated heat is dissipated from inside to outside. Under the above effect, the blood capillary is dilated, the blood circulation is promoted, the metabolism of the tissues is strengthened, the regeneration capacity of the tissues is increased, and the immunological competence of the human body is improved, thereby making the healthcare function.

The graphene is a nanometer material having the two-dimensional crystal structure. Besides the excellent mechanical property, electrical conductivity and thermal conductivity, the graphene has the large specific surface area and good far-infrared emitting property and ultraviolet absorption property, which is an ideal ultraviolet protective material and far-infrared functional material or filler. At present, some patents report that the far-infrared function is introduced to the fabric through adding the graphene. However, although the nylon-6 is one of the artificial fibers having the highest consumption amount, the far-infrared function of the composite fiber of the nylon-6 and graphene has not been reported. There are three technical difficulties as follows. Firstly, because the nylon-6 adopts the melt spinning, the graphene must be well dispersed in the polymer matrix in the form of single layer for high-speed spinning, so as to weave the nylon fabric suitable for wearing. If the dispersion of the graphene is not good, the spinning nozzle of the high-speed spinning will be blocked, causing the failed spinning. Secondly, the small transverse dimension of the graphene is beneficial to the dispersion, but the far-infrared effect is not good; the large transverse dimension of the graphene will increase the difficulty of dispersing the graphene in the nylon-6. Thirdly, the small carbon-oxygen ratio of the graphene is beneficial to the dispersion, but the graphene of high oxygen content has the poor far-infrared effect; if increasing the carbon-oxygen ratio of the graphene, the difficulty of dispersing the graphene in the nylon-6 is also increased. Carbon 95 (2015) 625-633 reported that the graphene was introduced to the fabric through fabric surface coating, so as to obtain the far-infrared function. However, for the above method, a risk that the far-infrared effect will be attenuated with the increase of the washing times exists, and the certain environmental pollution problem is brought. The above kind of the far-infrared functional fabric has the limited service life due to washing and abrasions, which not only decreases the cost-performance ratio of the products but also causes the resource waste and environmental pollution by the obsolete products after losing efficacy. Thus, developing a graphene/nylon-6 fabric having the permanent far-infrared healthcare function is a technical problem should be urgently solved, which has the great market potential.

SUMMARY OF THE PRESENT INVENTION

An object of the present invention is to provide a high-strength high-modulus graphene/nylon-6 fiber and a preparation method thereof, a graphene/nylon-6 fabric with a permanent far-infrared healthcare function and a preparation method thereof, so as to solve problems existing in prior art.

Technical solutions of the present invention are described as follows.

A high-strength high-modulus graphene/nylon-6 fiber is provided, which is obtained through processing a graphene/nylon-6 composite and an additive with high-speed melt spinning, wherein: a weight ratio of the graphene/nylon-6 composite and the additive is 100:(0-5); the graphene/nylon-6 composite consists of nylon-6 and single-layer graphene grafted with the nylon-6: the graphene/nylon-6 composite has a relative viscosity between 3.2 and 3.6; the single-layer graphene grafted with the nylon-6 has a transverse dimension larger than two micrometers; and a ratio of total weights of the graphene and the nylon-6 is (0.1-0.5): 100.

A method for preparing a high-strength high-modulus graphene/nylon-6 fiber comprises steps of: uniformly mixing a graphene/nylon-6 composite and an additive with a weight ratio of 100:(0-5); then processing with high-speed melt spinning; and obtaining the high-strength high-modulus graphene/nylon-6 fiber.

Preferably, the graphene/nylon-6 composite is prepared through steps of:

(1), adding modified graphene, a molecular weight modifier, and deionized water into a caprolactam melt, wherein a weight ratio of the modified graphene, the molecular weight modifier, the deionized water and the caprolactam melt is (0.1-0.5):(0.05-0.3):(1-10): 100; stirring and uniformly mixing at 80° C. with a high speed (300-500 rpm), and forming a dispersion liquid; wherein: the modified graphene is single-layer graphene with carboxyl and hydroxyl on a surface; and a carbon-oxygen ratio is between 2.5 and 6; and (2), under protection of nitrogen, increasing a temperature of the dispersion liquid to 250-270° C. in a polycondensation reactor, and reacting for 3 hours at 0.5-1 MPa; then reacting for 4 hours in a vacuum, and obtaining a polymer melt; processing the polymer melt with water-cooling granulation, and finally obtaining the graphene/nylon-6 composite.

Preferably, the graphene has a transverse dimension larger than or equal to 3 µm.

Further preferably, the graphene has a transverse dimension between 3-10 µm.

Preferably, the molecular weight modifier comprises at least one member selected from a group consisting of formic acid, acetic acid, propionic acid, ammonia solution, methylamine, ethylamine, propylamine and ethylenediamine in any proportion.

Preferably, for high-speed melt spinning, a melt temperature is 250-320° C., a continuous spinning speed is 1000-4000 m/min, and a draft ratio is 4-6.

Preferably, the additive comprises at least one member selected from a group consisting of antioxidant, anti-aging agent, heat stabilizer, and antistatic agent in any proportion.

A graphene/nylon-6 fabric with a permanent far-infrared healthcare function is provided, which is obtained through weaving a graphene/nylon-6 composite fiber, wherein: in every square meter of fabric, a consumption of the graphene/nylon-6 composite fiber is not less than 80 g; the graphene/nylon-6 composite fiber is obtained through processing a graphene/nylon-6 composite and an additive with high-speed melt spinning; the graphene/nylon-6 composite consists of nylon-6 and single-layer graphene grafted with the nylon-6; the single-layer graphene grafted with the nylon-6 has a transverse dimension larger than one micrometer; a ratio of total weights of the graphene and the nylon-6 is (0.01-0.5):100; and, a weight ratio of the additive and the graphene/nylon-6 composite is (0-5):100.

Preferably, the graphene/nylon-6 fabric has a far-infrared emitting rate larger than 0.88.

A method for preparing a graphene/nylon-6 fabric with a permanent far-infrared healthcare function comprises steps of: weaving a graphene/nylon-6 composite fiber, wherein: in every square meter of fabric, a consumption of the graphene/nylon-6 composite fiber is not less than 80 g.

Preferably, the graphene/nylon-6 composite fiber is prepared through steps of:

(1), adding modified graphene and deionized water into a caprolactam melt, wherein a weight ratio of the modified graphene, the deionized water and the caprolactam melt is (0.01-0.5):(1-10):100; stirring and uniformly mixing at 80° C. with a high speed (300-500 rpm), and forming a dispersion liquid; wherein: the modified graphene is single-layer graphene with carboxyl and hydroxyl on a surface; and a carbon-oxygen ratio is between 3.0 and 6;

(2), under protection of nitrogen, increasing a temperature of the dispersion liquid to 250-270° C. in a polycondensation reactor, and reacting for 3 hours at 0.5-1 MPa; then reacting for 4 hours in a vacuum, and obtaining a polymer melt; processing the polymer melt with water-cooling granulation, and obtaining a graphene/nylon-6 composite; and (3), processing the graphene/nylon-6 composite and an additive with high-speed melt spinning, wherein: for high-speed melt spinning, a melt temperature is 250-320° C., a continuous spinning speed is 600-6000 m/min, a draft ratio is 1.5-4, and the obtained fiber has a diameter of 5-50 µm.

Preferably, the graphene has a transverse dimension larger than 1 µm, and a carbon-oxygen ratio of the graphene is between 4.5 and 6.

Preferably, the additive comprises at least one member selected from a group consisting of antioxidant, anti-aging agent, heat stabilizer, and antistatic agent in any proportion.

When further increasing the consumption of the graphene/nylon-6 composite fiber in the fabric (in every square meter of fabric, the consumption of the graphene/nylon-6 composite fiber is not less than 150 g), the fabric has the ultraviolet protective property, wherein the graphene/nylon-6 fabric has an ultraviolet protection factor (UPF) larger than 40 and an ultraviolet A (UVA) transmittance T lower than 5%. The fabric is obtained through weaving a graphene/nylon-6 composite fiber obtained through steps of:

(1), adding modified graphene and deionized water into a caprolactam melt, wherein a weight ratio of the modified graphene, the deionized water and the caprolactam melt is (0.01-0.5):(1-10):100; stirring and uniformly mixing at 80° C. with a high speed (300-500 rpm), and forming a dispersion liquid; wherein: the modified graphene is single-layer graphene with oxygen-containing functional groups such as carboxyl and hydroxyl on a surface; and a carbon-oxygen ratio is between 2.5 and 6;

(2), under protection of nitrogen, increasing a temperature of the dispersion liquid to 250-270° C. in a polycondensation reactor, and reacting for 3 hours at 0.5-1 MPa; then reacting for 4 hours in a vacuum, and obtaining a polymer melt;

processing the polymer melt with water-cooling granulation, and obtaining a graphene/nylon-6 composite; and (3), mixing the graphene/nylon-6 composite and an additive, and then processing with high-speed melt spinning, wherein: for high-speed melt spinning, a melt temperature is 250-320° C., a continuous spinning speed is 600-6000 m/min, a draft ratio is 1.5-4, and the obtained fiber has a diameter of 5-50 μm.

Preferably, the graphene has a transverse dimension larger than 1 μm.

Further preferably, the graphene has a transverse dimension between 2-10 μm.

Preferably, the additive comprises at least one member selected from a group consisting of antioxidant, anti-aging agent, heat stabilizer, and antistatic agent in any proportion.

The present invention has following beneficial effects.

(1) The nylon-6 is modified with the modified graphene, so as to prepare the graphene/nylon-6 composite. Within the certain mass range, the modified graphene is able to be dispersed in the graphene/nylon-6 system in the form of single layer, which prevents the spinning nozzle from being blocked; moreover, binding of the graphene and the nylon-6 matrix is good, so that the broken fiber will not be formed; meanwhile, the melt viscosity is controlled in an appropriate range, and the continuous high-speed spinning is feasible, especially the production of the coarse industrial fibers. The obtained graphene/nylon-6 composite fiber has the excellent mechanical properties such as the high strength and high modules that a tensile strength is larger than 8.0 cN/dtex and an initial modulus is larger than 9 GPa, which can be applied in defense and industrial fields of tire cord, industrial cloth, fishing net and cable.

(2) With the method of in situ polymerization, a little amount of graphene is added into the nylon-6 matrix; the compatibility of the modified single-layer graphene and the nylon-6 matrix is good, so that the graphene is able to be dispersed in the graphene/nylon-6 system in the form of single layer, which prevents the spinning nozzle from being blocked, avoids the generation of the broken fiber, and makes the industrial continuous high-speed spinning feasible. Compared with the pure nylon-6 fabric, the obtained graphene/nylon-6 fabric not only has the more excellent comprehensive property, but also has the far-infrared healthcare function. Moreover, because the graphene is uniformly dispersed in the interior of the composite fibers constituting the fabric, the far-infrared healthcare function will not be attenuated with the increase of washing times and abrasions of the fabric surface. The graphene/nylon-6 fabric with the far-infrared healthcare function can be widely applied in production of underwear, blanket, bedding and tent. The preparation process is suitable for scale production and is well applicable to the traditional fabric production device.

(3) With the method of in situ polymerization, a little amount of graphene is added into the nylon-6 matrix; the compatibility of the modified single-layer graphene and the nylon-6 matrix is good, so that the graphene is able to be dispersed in the graphene/nylon-6 system in the form of single layer, which prevents the spinning nozzle from being blocked, avoids the generation of the broken fiber, and makes the industrial continuous high-speed spinning feasible. Compared with the pure nylon-6 fabric, the obtained graphene/nylon-6 fabric not only has the more excellent comprehensive property, but also has the ultraviolet protective property. Moreover, because the graphene is uniformly dispersed in the interior of the composite fibers constituting the fabric, the product has the good stability, and the precipitation phenomenon of the ultraviolet absorbent and screening agent will not happen. Thus, the ultraviolet protective function will not be attenuated with the increase of washing times and abrasions of the fabric surface. The functional graphene/nylon-6 fabric with the ultraviolet protective property can be widely applied in production of protective and screening products, such as sun-protective clothing, sun umbrella, tent, curtain and swimsuit. The preparation process is suitable for scale production and is well applicable to the traditional fabric production device.

DETAILED DESCRIPTION OF THE PREFERRED EMBODIMENT

The present invention is further described in detail with examples as follows. The examples are merely for further illustrating the present invention, not for limiting the protection scope of the present invention. Non-essential changes and adjustments made by one skilled in the art according to the examples are all included in the protection scope of the present invention.

Example 1-1

Adding single-layer graphene, a molecular weight modifier and deionized water into a caprolactam melt, wherein: contents of the single-layer graphene, the molecular weight modifier, the deionized water and the caprolactam melt are respectively 0.1, 0.07, 10 and 100 parts by mass; and the single-layer graphene has a carbon-oxygen ratio of 2.8 and a transverse dimension of 3 μm; stirring and uniformly mixing at 80° C. with a high speed (400 rpm), and forming a dispersion liquid; under protection of nitrogen, increasing a temperature of the dispersion liquid to 250° C. in a polycondensation reactor, and reacting for 3 hours at 0.7 MPa; then reacting for 4 hours in a vacuum, and obtaining a polycondensate melt; processing the polycondensate melt with water-cooling granulation, and obtaining a graphene/nylon-6 composite; uniformly dispersing the obtained graphene/nylon-6 composite and an additive, wherein a content of the additive is 0.5 parts by mass, and then processing with high-speed melt spinning at 295° C. with a spinning speed of 1500 m/min and a draft ratio of 5; and obtaining a graphene/nylon-6 fiber, wherein the graphene/nylon-6 fiber is made with a mechanical property test according to a national standard and experimental results thereof are showed in Table 1.

Example 1-2

Adding single-layer graphene, a molecular weight modifier and deionized water into a caprolactam melt, wherein: contents of the single-layer graphene, the molecular weight modifier, the deionized water and the caprolactam melt are respectively 0.3, 0.1, 10 and 100 parts by mass; and the single-layer graphene has a carbon-oxygen ratio of 3.0 and a transverse dimension of 3 μm; stirring and uniformly mixing at 80° C. with a high speed (400 rpm), and forming a dispersion liquid; under protection of nitrogen, increasing a temperature of the dispersion liquid to 250° C. in a polycondensation reactor, and reacting for 3 hours at 0.7 MPa; then reacting for 4 hours in a vacuum, and obtaining a polycondensate melt; processing the polycondensate melt with water-cooling granulation, and obtaining a graphene/nylon-6 composite; uniformly dispersing the obtained graphene/nylon-6 composite and an additive, wherein a content of the additive is 0.5 parts by mass, and then processing with high-speed melt spinning at 295° C. with a spinning speed of 2000 m/min and a draft ratio of 5, and obtaining a graphene/nylon-6 fiber, wherein the graphene/nylon-6 fiber is made with a mechanical property test according to a national standard and experimental results thereof are showed in Table 1.

Example 1-3

Adding single-layer graphene, a molecular weight modifier and deionized water into a caprolactam melt, wherein: contents of the single-layer graphene, the molecular weight modifier, the deionized water and the caprolactam melt are respectively 0.2, 0.08, 10 and 100 parts by mass; and the single-layer graphene has a carbon-oxygen ratio of 3.0 and a transverse dimension of 7 μm; stirring and uniformly mixing at 80° C. with a high speed (400 rpm), and forming a dispersion liquid; under protection of nitrogen, increasing a temperature of the dispersion liquid to 250° C. in a polycondensation reactor, and reacting for 3 hours at 0.7 MPa; then reacting for 4 hours in a vacuum, and obtaining a polycondensate melt; processing the polycondensate melt with water-cooling granulation, and obtaining a graphene/nylon-6 composite; uniformly dispersing the obtained graphene/nylon-6 composite and an additive, wherein a content of the additive is 0.5 parts by mass, and then processing with high-speed melt spinning at 295° C. with a spinning speed of 2500 m/min and a draft ratio of 5; and obtaining a graphene/nylon-6 fiber, wherein the graphene/nylon-6 fiber is made with a mechanical property test according to a national standard and experimental results thereof are showed in Table 1.

Example 1-4

Adding single-layer graphene, a molecular weight modifier and deionized water into a caprolactam melt, wherein: contents of the single-layer graphene, the molecular weight modifier, the deionized water and the caprolactam melt are respectively 0.2, 0.09, 10 and 100 parts by mass; and the single-layer graphene has a carbon-oxygen ratio of 4.2 and a transverse dimension of 3 μm; stirring and uniformly mixing at 80° C. with a high speed (400 rpm), and forming a dispersion liquid; under protection of nitrogen, increasing a temperature of the dispersion liquid to 250° C. in a polycondensation reactor, and reacting for 3 hours at 0.7 MPa; then reacting for 4 hours in a vacuum, and obtaining a polycondensate melt; processing the polycondensate melt with water-cooling granulation, and obtaining a graphene/nylon-6 composite; uniformly dispersing the obtained graphene/nylon-6 composite and an additive, wherein a content of the additive is 0.5 parts by mass, and then processing with high-speed melt spinning at 295° C. with a spinning speed of 3000 m/min and a draft ratio of 5; and obtaining a graphene/nylon-6 fiber, wherein the graphene/nylon-6 fiber is made with a mechanical property test according to a national standard and experimental results thereof are showed in Table 1.

Example 1-5

Adding single-layer graphene, a molecular weight modifier and deionized water into a caprolactam melt, wherein: contents of the single-layer graphene, the molecular weight modifier, the deionized water and the caprolactam melt are respectively 0.3, 0.01, 10 and 100 parts by mass; and the single-layer graphene has a carbon-oxygen ratio of 3.5 and a transverse dimension of 5 μm; stirring and uniformly mixing at 80° C. with a high speed (400 rpm), and forming a dispersion liquid; under protection of nitrogen, increasing a temperature of the dispersion liquid to 250° C. in a polycondensation reactor, and reacting for 3 hours at 0.7 MPa; then reacting for 4 hours in a vacuum, and obtaining a polycondensate melt; processing the polycondensate melt with water-cooling granulation, and obtaining a graphene/nylon-6 composite; and uniformly dispersing the obtained graphene/nylon-6 composite and an additive, wherein a content of the additive is 0.5 parts by mass. However, during spinning, because the melt has a high viscosity, stable spinning cannot be realized.

Example 1-6

Adding single-layer graphene, a molecular weight modifier and deionized water into a caprolactam melt, wherein: contents of the single-layer graphene, the molecular weight modifier, the deionized water and the caprolactam melt are respectively 0.6, 0.15, 10 and 100 parts by mass; and the single-layer graphene has a carbon-oxygen ratio of 3.5 and a transverse dimension of 3 μm; stirring and uniformly mixing at 80° C. with a high speed (400 rpm), and forming a dispersion liquid; under protection of nitrogen, increasing a temperature of the dispersion liquid to 250° C. in a polycondensation reactor, and reacting for 3 hours at 0.7 MPa; then reacting for 4 hours in a vacuum, and obtaining a polycondensate melt; processing the polycondensate melt with water-cooling granulation, and obtaining a graphene/nylon-6 composite; and uniformly dispersing the obtained graphene/nylon-6 composite and an additive, wherein a content of the additive is 0.5 parts by mass. However, it is found that the graphene/nylon-6 composite blocks the spinning nozzle, so that the graphene/nylon-6 fiber is unable to be obtained.

Example 1-7

Adding single-layer graphene, a molecular weight modifier and deionized water into a caprolactam melt, wherein: contents of the single-layer graphene, the molecular weight modifier, the deionized water and the caprolactam melt are respectively 0.4, 0.1, 10 and 100 parts by mass; and the single-layer graphene has a carbon-oxygen ratio of 2.8 and a transverse dimension of 1 μm; stirring and uniformly mixing at 80° C. with a high speed (400 rpm), and forming a dispersion liquid; under protection of nitrogen, increasing a temperature of the dispersion liquid to 250° C. in a polycondensation reactor, and reacting for 3 hours at 0.7 MPa; then reacting for 4 hours in a vacuum, and obtaining a polycondensate melt; processing the polycondensate melt with water-cooling granulation, and obtaining a graphene/nylon-6 composite; uniformly dispersing the obtained graphene/nylon-6 composite and an additive, wherein a content of the additive is 0.5 parts by mass, and then processing with high-speed melt spinning at 295° C. with a spinning speed of 3000 m/min and a draft ratio of 5.5; and obtaining a graphene/nylon-6 fiber, wherein the graphene/nylon-6 fiber is made with a mechanical property test according to a national standard and experimental results thereof are showed in Table 1.

Example 1-8

Adding single-layer graphene, a molecular weight modifier and deionized water into a caprolactam melt, wherein: contents of the single-layer graphene, the molecular weight modifier, the deionized water and the caprolactam melt are respectively 0.2, 0.09, 10 and 100 parts by mass; and the single-layer graphene has a carbon-oxygen ratio of 2.3 and a transverse dimension of 5 μm; stirring and uniformly mixing at 80° C. with a high speed (400 rpm), and forming a dispersion liquid; under protection of nitrogen, increasing to a temperature of the dispersion liquid to 250° C. in a polycondensation reactor, and reacting for 3 hours at 0.7 MPa; then reacting for 4 hours in a vacuum, and obtaining a polycondensate melt; processing the polycondensate melt with water-cooling granulation, and obtaining a graphene/nylon-6 composite; uniformly dispersing the obtained graphene/nylon-6 composite and an additive, wherein a content of the additive is 0.5 parts by mass, and then processing with high-speed melt spinning at 295° C. with a spinning speed of 3000 m/min and a draft ratio of 5.5; and obtaining a graphene/nylon-6 fiber, wherein the graphene/nylon-6 fiber is made with a mechanical property test according to a national standard and experimental results thereof are showed in Table 1.

Figure 1:
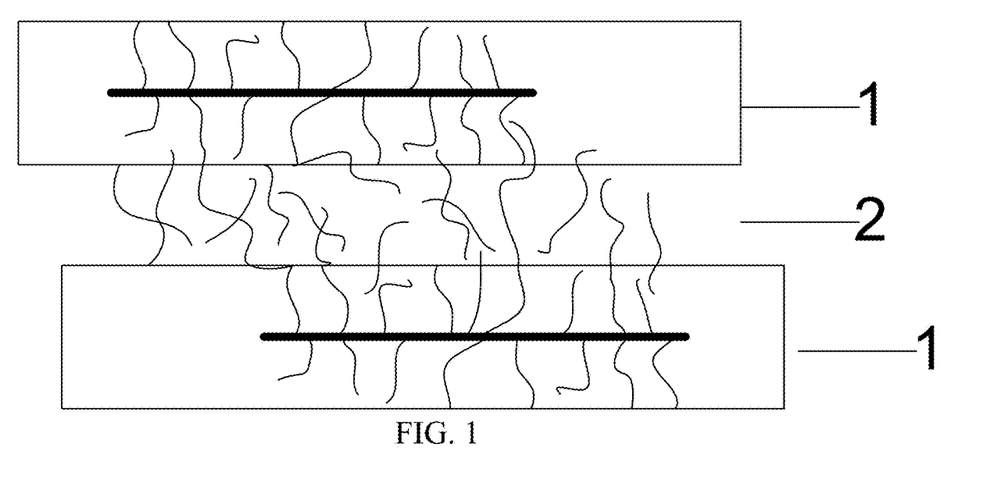
FIG. 1 is a local structural sketch view of a graphene/nylon-6 fiber, wherein: "1" represents a single-layer graphene sheet grafted with nylon-6; and "2" represents free nylon-6.

Table 1 shows comparison of mechanical properties of the graphene/nylon-6 fibers and the pure nylon-6 fiber, which are obtained through respectively mixing the graphene/nylon-6 composite or the nylon-6 with the additive and then processing with high-speed melt spinning, wherein: in the examples 1-1 to 1-4, an addition amount of the graphene is within the scope of the present invention, and compared with the pure nylon-6 fiber, the obtained graphene/nylon-6 fibers have the obviously increased mechanical properties that the tensile strengths are all larger than 8.0 cN/dtex and the initial moduli are all larger than 9 GPa; in the example 1-5, an addition amount of the molecular weight modifier is too less, and the melt viscosity is too large, causing the unstable spinning; in the example 1-6, when the addition amount of the graphene is 0.6%, the single-layer graphene stacks, and the spinning nozzle is blocked during high-speed spinning, so that the continuous fiber cannot be obtained; in the example 1-7, the dimension of the graphene is too small, and the mechanical properties thereof are poor; and in the example 1-8, the carbon-oxygen ratio of the graphene is smaller than 2.5, and the large number of defects of the graphene cause the relatively small conjugate area of the graphene and the poor mechanical properties of the graphene/nylon-6 fiber. The large amount of experimental data indicates that: only when the graphene and the synthesis method with the technical parameters within the scope of the present invention are adopted, the high-strength high-modulus graphene/nylon-6 fiber can be obtained. FIG. 1 is a local structural sketch view of the graphene/nylon-6 fiber, wherein: "1" represents a single-layer graphene sheet grafted with nylon-6; and "2" represents free nylon-6.

TABLE 1

| | Modified graphene | | | Mass percent of molecular weight modifier to caprolactam (%) | Relative viscosity | Tensile strength (cN/dtex) | Initial modulus (GPa) |
|---|---|---|---|---|---|---|---|
| | Content (%) | Average transverse dimension (μm) | Carbon-oxygen ratio | | | | |
| Nylon-6 | 0 | 0 | 0 | 0.05 | 3.2 | 0.59 | 7.2 |
| Example 1-1 | 0.1 | 3 | 2.8 | 0.07 | 3.5 | 8.6 | 9.2 |
| Example 1-2 | 0.3 | 3 | 3.0 | 0.10 | 3.5 | 8.9 | 10.1 |
| Example 1-3 | 0.2 | 7 | 3.0 | 0.08 | 3.5 | 9.0 | 9.0 |
| Example 1-4 | 0.2 | 3 | 4.2 | 0.09 | 3.4 | 8.4 | 10.5 |
| Example 1-5 | 0.3 | 5 | 3.5 | 0.01 | 3.8 | / | / |
| Example 1-6 | 0.6 | 3 | 3.5 | 0.15 | 4.0 | / | / |
| Example 1-7 | 0.4 | 1 | 2.8 | 0.10 | 3.6 | 7.8 | 8.9 |
| Example 1-8 | 0.2 | 5 | 2.3 | 0.09 | 3.6 | 7 7 | 8.4 |

Example 2-1

Adding single-layer graphene and deionized water into a caprolactam melt, wherein: contents of the single-layer graphene, the deionized water and the caprolactam melt are respectively 0.1, 10 and 100 parts by mass; and the single-layer graphene has a carbon-oxygen ratio of 4.9 and a transverse dimension of 3 μm; stirring and uniformly mixing at 80° C. with a high speed (400 rpm), and forming a dispersion liquid; under protection of nitrogen, increasing a temperature of the dispersion liquid to 250° C. in a polycondensation reactor, and reacting for 3 hours at 0.7 MPa; then reacting for 4 hours in a vacuum, and obtaining a polycondensate melt; processing the polycondensate melt with water-cooling granulation, and obtaining a graphene/nylon-6 composite; uniformly dispersing the obtained graphene/nylon-6 composite and an additive, wherein a content of the additive is 0.5 parts by mass, and then processing with high-speed melt spinning at 295° C. with a spinning speed of 1000 m/min and a draft ratio of 3; obtaining a graphene/ nylon-6 fiber; and weaving the graphene/nylon-6 fiber into a fabric, wherein: a consumption of the graphene/nylon-6 fiber is 120 g per square meter; the obtained fabric is tested according to a national standard of GB/T130127-2013, and test results thereof are showed in Table 2.

Figure 3:
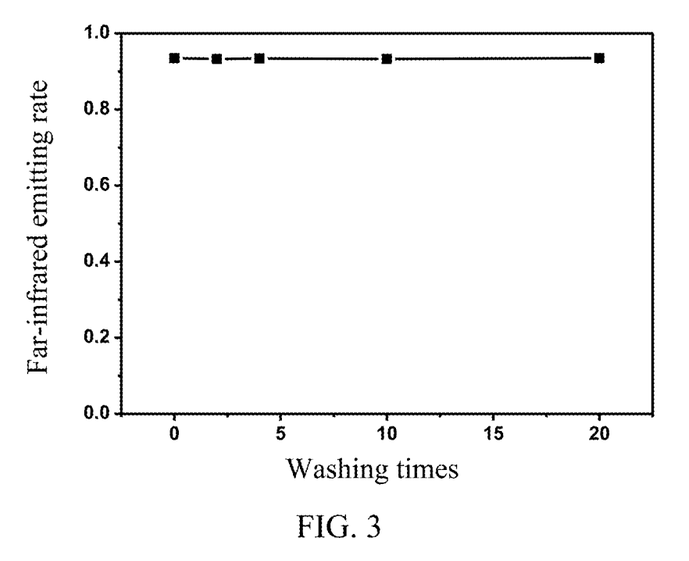
FIG. 3 is a diagram showing changes of a far-infrared emitting rate of a graphene/nylon-6 fabric having a permanent far-infrared healthcare function with washing times according to example 2-1 of the present invention.

Test results about changes of the far-infrared emitting rate of the fabric with washing times are showed in FIG. 3. It can be seen from FIG. 3 that the far-infrared emitting rate of the fabric has no obvious change after 20 times of washing. Therefore, with guaranteeing the spinnability, the present invention transforms the binding way between the far-infrared functional additive and the fiber matrixes from the traditional physical binding way (such as coating and blending) to the chemical binding way, so that the chemical binding between the graphene and nylon-6 fiber matrixes is stable, which greatly increases the far-infrared healthcare function of the fabric and lengthens the service life of the fabric.

Example 2-2

Adding single-layer graphene and deionized water into a caprolactam melt, wherein: contents of the single-layer graphene, the deionized water and the caprolactam melt are respectively 0.2, 10 and 100 parts by mass; and the single-layer graphene has a carbon-oxygen ratio of 5.4 and a transverse dimension of 7 μm; stirring and uniformly mixing at 80° C. with a high speed (400 rpm), and forming a dispersion liquid; under protection of nitrogen, increasing a temperature of the dispersion liquid to 250° C. in a polycondensation reactor, and reacting for 3 hours at 0.7 MPa; then reacting for 4 hours in a vacuum, and obtaining a polycondensate melt; processing the polycondensate melt with water-cooling granulation, and obtaining a graphene/nylon-6 composite; uniformly dispersing the obtained graphene/nylon-6 composite and an antioxidant, wherein a content of the antioxidant is 0.5 parts by mass, and then processing with high-speed melt spinning at 295° C. with a spinning speed of 1000 m/min and a draft ratio of 3; obtaining a graphene/nylon-6 fiber; and weaving the graphene/nylon-6 fiber into a fabric, wherein: a consumption of the graphene/nylon-6 fiber is 90 g per square meter; the obtained fabric is tested according to a national standard of GB/T130127-2013, and test results thereof are showed in Table 2.

Example 2-3

Adding single-layer graphene and deionized water into a caprolactam melt, wherein: contents of the single-layer graphene, the deionized water and the caprolactam melt are respectively 0.3, 10 and 100 parts by mass; and the single-layer graphene has a carbon-oxygen ratio of 4.9 and a transverse dimension of 5 μm; stirring and uniformly mixing at 80° C. with a high speed (400 rpm), and forming a dispersion liquid; under protection of nitrogen, increasing a temperature of the dispersion liquid to 250° C. in a polycondensation reactor, and reacting for 3 hours at 0.7 MPa; then reacting for 4 hours in a vacuum, and obtaining a polycondensate melt; processing the polycondensate melt with water-cooling granulation, and obtaining a graphene/nylon-6 composite; uniformly dispersing the obtained graphene/nylon-6 composite and an anti-aging agent, wherein a content of the anti-aging agent is 0.5 parts by mass, and then processing with high-speed melt spinning at 295° C. with a spinning speed of 1000 m/min and a draft ratio of 3; obtaining a graphene/nylon-6 fiber; and weaving the graphene/nylon-6 fiber into a fabric, wherein: a consumption of the graphene/nylon-6 fiber is 90 g per square meter; the obtained fabric is tested according to a national standard of GB/T130127-2013, and test results thereof are showed in Table 2.

Example 2-4

Adding single-layer graphene and deionized water into a caprolactam melt, wherein: contents of the single-layer graphene, the deionized water and the caprolactam melt are respectively 0.05, 10 and 100 parts by mass; and the single-layer graphene has a carbon-oxygen ratio of 4.9 and a transverse dimension of 2 μm; stirring and uniformly mixing at 80° C. with a high speed (400 rpm), and forming a dispersion liquid; under protection of nitrogen, increasing a temperature of the dispersion liquid to 250° C. in a polycondensation reactor, and reacting for 3 hours at 0.7 MPa; then reacting for 4 hours in a vacuum, and obtaining a polycondensate melt; processing the polycondensate melt with water-cooling granulation, and obtaining a graphene/nylon-6 composite; uniformly dispersing the obtained graphene/nylon-6 composite and a heating stabilizer, wherein a content of the heating stabilizer is 0.5 parts by mass, and then processing with high-speed melt spinning at 295° C. with a spinning speed of 1000 m/min and a draft ratio of 3; obtaining a graphene/nylon-6 fiber; and weaving the graphene/nylon-6 fiber into a fabric, wherein: a consumption of the graphene/nylon-6 fiber is 180 g per square meter; the obtained fabric is tested according to a national standard of GB/T130127-2013, and test results thereof are showed in Table 2.

Example 2-5

Adding single-layer graphene and deionized water into a caprolactam melt, wherein: contents of the single-layer graphene, the deionized water and the caprolactam melt are respectively 0.1, 10 and 100 parts by mass; and the single-layer graphene has a carbon-oxygen ratio of 4.9 and a transverse dimension of 5 μm; stirring and uniformly mixing at 80° C. with a high speed (400 rpm), and forming a dispersion liquid; under protection of nitrogen, increasing a temperature of the dispersion liquid to 250° C. in a polycondensation reactor, and reacting for 3 hours at 0.7 MPa; then reacting for 4 hours in a vacuum, and obtaining a polycondensate melt; processing the polycondensate melt with water-cooling granulation, and obtaining a graphene/nylon-6 composite; uniformly dispersing the obtained graphene/nylon-6 composite and a heating stabilizer, wherein a content of the heating stabilizer is 0.5 parts by mass, and then processing with high-speed melt spinning at 295° C. with a spinning speed of 1000 m/min and a draft ratio of 3; obtaining a graphene/nylon-6 fiber; and weaving the graphene/nylon-6 fiber into a fabric, wherein: a consumption of the graphene/nylon-6 fiber is 50 g per square meter; the obtained fabric is tested according to a national standard of GB/T130127-2013, and test results thereof are showed in Table 2.

Example 2-6

Adding single-layer graphene and deionized water into a caprolactam melt, wherein: contents of the single-layer graphene, the deionized water and the caprolactam melt are respectively 0.1, 10 and 100 parts by mass; and the single-layer graphene has a carbon-oxygen ratio of 4.9 and a transverse dimension of 0.5 μm; stirring and uniformly mixing at 80° C. with a high speed (400 rpm), and forming a dispersion liquid; under protection of nitrogen, increasing a temperature of the dispersion liquid to 250° C. in a polycondensation reactor, and reacting for 3 hours at 0.7 MPa; then reacting for 4 hours in a vacuum, and obtaining a polycondensate melt; processing the polycondensate melt with water-cooling granulation, and obtaining a graphene/nylon-6 composite; uniformly dispersing the obtained graphene/nylon-6 composite and a heating stabilizer, wherein a content of the heating stabilizer is 0.5 parts by mass, and then processing with high-speed melt spinning at 295° C. with a spinning speed of 1000 m/min and a draft ratio of 3; obtaining a graphene/nylon-6 fiber; and weaving the graphene/nylon-6 fiber into a fabric, wherein: a consumption of the graphene/nylon-6 fiber is 200 g per square meter; the obtained fabric is tested according to a national standard of GB/T130127-2013, and test results thereof are showed in Table 2.

Example 2-7

Adding single-layer graphene and deionized water into a caprolactam melt, wherein: contents of the single-layer graphene, the deionized water and the caprolactam melt are respectively 0.6, 10 and 100 parts by mass; and the single-layer graphene has a carbon-oxygen ratio of 4.9 and a transverse dimension of 5 μm; stirring and uniformly mixing at 80° C. with a high speed (400 rpm), and forming a dispersion liquid; under protection of nitrogen, increasing a temperature of the dispersion liquid to 250° C. in a polycondensation reactor, and reacting for 3 hours at 0.7 MPa; then reacting for 4 hours in a vacuum, and obtaining a polycondensate melt; processing the polycondensate melt with water-cooling granulation, and obtaining a graphene/nylon-6 composite; uniformly dispersing the obtained graphene/nylon-6 composite and an additive, wherein a content of the additive is 1 part by mass, and then processing with high-speed melt spinning at 310° C. It is found that the graphene/nylon-6 composite blocks the spinning nozzle, and the graphene/nylon-6 fiber cannot be obtained.

Example 2-8

Adding single-layer graphene and deionized water into a caprolactam melt, wherein: contents of the single-layer graphene, the deionized water and the caprolactam melt are respectively 0.1, 10 and 100 parts by mass; and the single-layer graphene has a carbon-oxygen ratio of 2.8 and a transverse dimension of 9 μm; stirring and uniformly mixing at 80° C. with a high speed (400 rpm), and forming a dispersion liquid; under protection of nitrogen, increasing a temperature of the dispersion liquid to 250° C. in a polycondensation reactor, and reacting for 3 hours at 0.7 MPa; then reacting for 4 hours in a vacuum, and obtaining a polycondensate melt; processing the polycondensate melt with water-cooling granulation, and obtaining a graphene/nylon-6 composite; uniformly dispersing the obtained graphene/nylon-6 composite and a heating stabilizer, wherein a content of the heating stabilizer is 0.5 parts by mass, and then processing with high-speed melt spinning at 295° C. with a spinning speed of 1000 m/min and a draft ratio of 3; obtaining a graphene/nylon-6 fiber; and weaving the graphene/nylon-6 fiber into a fabric, wherein: a consumption of the graphene/nylon-6 fiber is 120 g per square meter; the obtained fabric is tested according to a national standard of GB/T130127-2013, and test results thereof are showed in Table 2.

Comparison 2-1

Adding a caprolactam melt into a polycondensation reactor, increasing a temperature to 255° C., and reacting for 3 hours at 0.75 MPa; then reacting for 4 hours in a vacuum, and obtaining a polycondensate melt; processing the polycondensate melt with water-cooling granulation, and obtaining nylon-6; uniformly dispersing the obtained nylon-6 and a heating stabilizer, wherein a content of the heating stabilizer is 1 part by mass, and then processing with high-speed melt spinning at 260° C. with a spinning speed of 1500 m/min and a draft ratio of 2.3; obtaining a nylon-6 fiber with a diameter of 23 μm; and weaving the pure nylon-6 fiber into a fabric, wherein: the obtained fabric is tested according to a national standard of GB/T130127-2013, and test results thereof are showed in Table 2.

Figure 2:
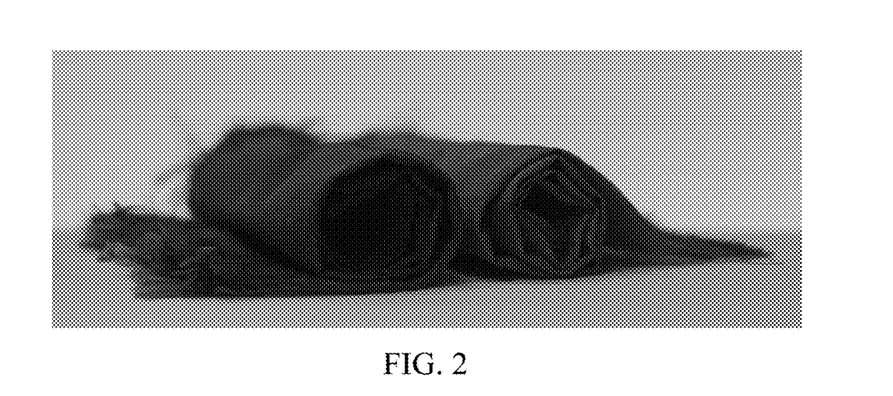
FIG. 2 is a digital photo of a graphene/nylon-6 fabric with a permanent far-infrared healthcare function prepared by the present invention.

Table 2 shows comparison of far-infrared emitting rates of the fabrics, which are obtained respectively through weaving the pure nylon-6 fiber and the various graphene/nylon-6 fibers, wherein the various graphene/nylon-6 fibers are obtained through respectively mixing the graphene/nylon-6 composite with various additives and then processing with high-speed melt spinning. In the examples 2-1 to 2-4, an addition amount of the graphene is within the scope of the present invention, and compared with the pure nylon-6, the obtained fabrics have the excellent far-infrared healthcare function; in the example 2-5, the consumption of the graphene/nylon-6 fiber per square meter of fabric is less than 80 g, and the far-infrared emitting rate is relatively low, which illustrates that the amount of the graphene/nylon-6 fiber per square meter of fabric should not be less than 80 g; in the example 2-6, the transverse dimension of the graphene is 500 nm, smaller than 1 μm, and the far-infrared emitting rate is low, which illustrates that the transverse dimension of the graphene is the key of the far-infrared emitting property; in the example 2-7, when the addition amount of the graphene is 0.6%, the single-layer graphene stacks, and the spinning nozzle is blocked during high-speed spinning, so that the continuous fiber cannot be obtained; in the example 2-8, the carbon-oxygen ratio of the graphene is smaller than 3, and the large number of defects of the graphene cause the relatively small conjugate area of the graphene and the poor far-infrared emitting rate of the fabric. The large amount of experimental data indicates that: only when the carbon-oxygen ratio of the graphene is between 3 and 6, the graphene/nylon-6 fabric having the relatively high far-infrared emitting rate can be obtained; wherein: when the carbon-oxygen ratio of the graphene is between 4.5 and 6, the effect is best, and the addition amount of the graphene is least. The large amount of experimental data also indicates that: only when the graphene with the technical parameters within the scope of the present invention is adopted, the graphene/nylon-6 fabric having the relatively good far-infrared healthcare function can be obtained. FIG. 2 shows a digital photo of the graphene/nylon-6 fabric with the permanent far-infrared healthcare function.

TABLE 2

| | Modified graphene | | | Consumption of graphene/nylon-6 fiber per square meter of fabric (g/m²) | Far-infrared emitting rate |
|---|---|---|---|---|---|
| | Content (%) | Average transverse dimension (μm) | Carbon-oxygen ratio | | |
| Nylon-6 | 0 | 0 | 0 | 0 | 0.779 |
| Example 2-1 | 0.1 | 3 | 4.9 | 120 | 0.935 |
| Example 2-2 | 0.2 | 7 | 5.4 | 90 | 0.945 |
| Example 2-3 | 0.3 | 5 | 4.9 | 90 | 0.936 |
| Example 2-4 | 0.05 | 2 | 4.9 | 180 | 0.883 |
| Example 2-5 | 0.1 | 5 | 4.9 | 50 | 0.796 |
| Example 2-6 | 0.1 | 0.5 | 4.9 | 200 | 0.811 |
| Example 2-7 | 0.6 | 5 | 4.9 | \ | \ |
| Example 2-8 | 0.1 | 9 | 2.8 | 120 | 0.802 |

Example 3-1

Adding single-layer graphene and deionized water into a caprolactam melt, wherein: contents of the single-layer graphene, the deionized water and the caprolactam melt are respectively 0.1, 10 and 100 parts by mass; and the single-layer graphene has a carbon-oxygen ratio of 3.2 and a transverse dimension of 2 μm; stirring and uniformly mixing at 80° C. with a high speed (400 rpm), and forming a dispersion liquid; under protection of nitrogen, increasing a temperature of the dispersion liquid to 250° C. in a polycondensation reactor, and reacting for 3 hours at 0.7 MPa; then reacting for 4 hours in a vacuum, and obtaining a polycondensate melt; processing the polycondensate melt with water-cooling granulation, and obtaining a graphene/nylon-6 composite; uniformly dispersing the obtained graphene/nylon-6 composite and an antioxidant, wherein a content of the antioxidant is 0.5 parts by mass, and then processing with high-speed melt spinning at 295° C. with a spinning speed of 1000 m/min and a draft ratio of 3; obtaining a graphene/nylon-6 fiber; and weaving the graphene/nylon-6 fiber into a fabric, wherein: a consumption of the graphene/nylon-6 fiber is 208 g per square meter; the obtained fabric is tested according to a national standard of GB/T18830-2009, and test results thereof are showed in Table 3.

Figure 4:
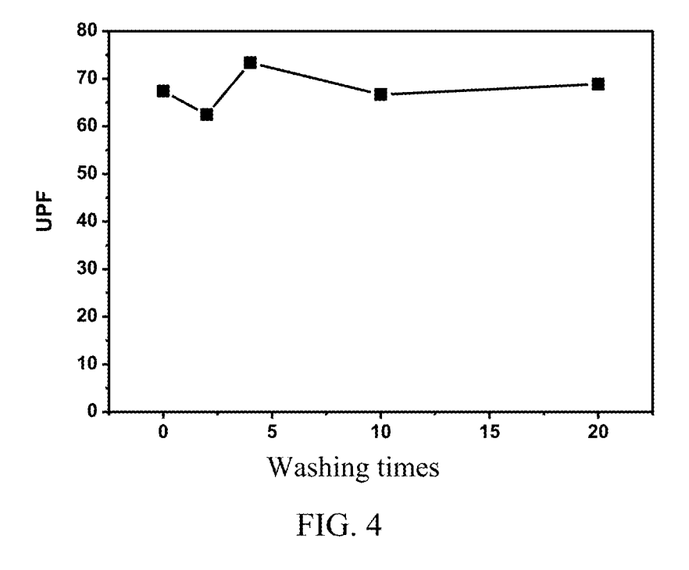
FIG. 4 is a diagram showing changes of an ultraviolet protection factor (UPF) value of a graphene/nylon-6 fabric having a permanent ultraviolet protective property with washing times according to example 3-1 of the present invention.
Figure 5:
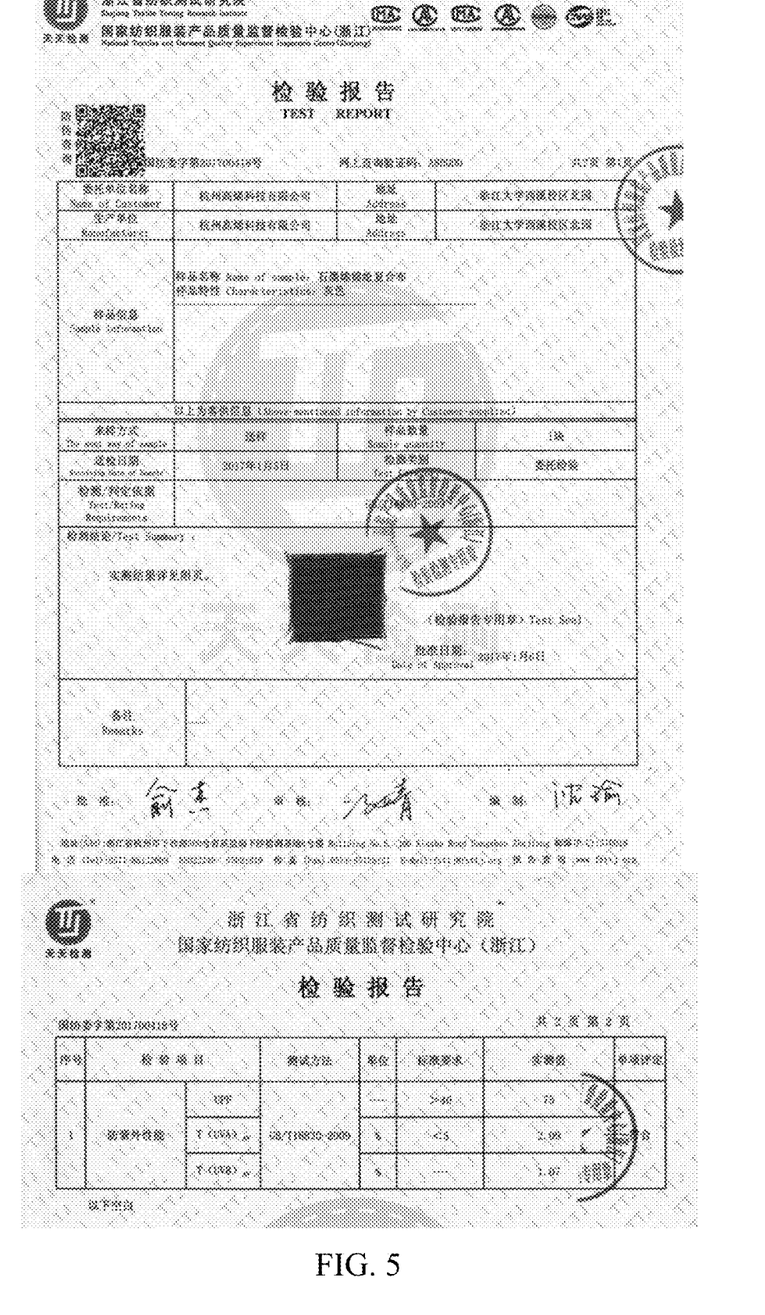
FIG. 5 is a photo of a quality report about an ultraviolet protective property of a graphene/nylon-6 fabric with a permanent ultraviolet protective property prepared by the present invention, wherein the quality report is made by Zhejiang Provincial Administration of Quality and Technology Supervision.

Test results about changes of the ultraviolet protective property of the fabric with washing times are showed in FIG. 4. It can be seen from FIG. 4 that the ultraviolet protection factor (UPF) of the fabric has no obvious change after 20 times of washing. Therefore, with guaranteeing the spinnability, the present invention transforms the binding way between the ultraviolet protecting agent and the fiber matrixes from the traditional physical binding way (such as coating and blending) to the chemical binding way, so that the chemical binding between the graphene and nylon-6 fiber matrixes is stable, which greatly increases the ultraviolet protection effect of the fabric and lengthens the service life of the fabric. FIG. 5 shows a photo of a quality report about the ultraviolet protective property of the graphene/nylon-6 fabric, wherein the quality report is made by Zhejiang Provincial Administration of Quality and Technology Supervision.

Example 3-2

Adding single-layer graphene and deionized water into a caprolactam melt, wherein: contents of the single-layer graphene, the deionized water and the caprolactam melt are respectively 0.2, 10 and 100 parts by mass; and the single-layer graphene has a carbon-oxygen ratio of 5.1 and a transverse dimension of 7 μm; stirring and uniformly mixing at 80° C. with a high speed (400 rpm), and forming a dispersion liquid; under protection of nitrogen, increasing a temperature of the dispersion liquid to 250° C. in a polycondensation reactor, and reacting for 3 hours at 0.7 MPa; then reacting for 4 hours in a vacuum, and obtaining a polycondensate melt; processing the polycondensate melt with water-cooling granulation, and obtaining a graphene/nylon-6 composite; uniformly dispersing the obtained graphene/nylon-6 composite and an antioxidant, wherein a content of the antioxidant is 0.5 parts by mass, and then processing with high-speed melt spinning at 295° C. with a spinning speed of 1000 m/min and a draft ratio of 3; obtaining a graphene/nylon-6 fiber; and weaving the graphene/nylon-6 fiber into a fabric, wherein: a consumption of the graphene/nylon-6 fiber is 180 g per square meter; the obtained fabric is tested according to a national standard of GB/T18830-2009, and test results thereof are to showed in Table 3.

TABLE 3

| | Modified graphene | | | Consumption of graphene/nylon-6 fiber per square meter of fabric (g/m²) | Ultraviolet protection factor (UPF) | UVA transmittance T (%) |
|---|---|---|---|---|---|---|
| | Content (%) | Average transver dimension (μm) | Carbon-oxygen ratio | | | |
| Nylon-6 | 0 | 0 | 0 | 0 | 5 | 31.36 |
| Example 3-1 | 0.1 | 2 | 3.2 | 208 | 75 | 2.09 |
| Example 3-2 | 0.2 | 7 | 5.1 | 180 | 82 | 1.99 |

What is claimed is:
1. A method for preparing a high-strength high-modulus graphene/nylon-6 fiber, comprising steps of: uniformly mixing a graphene/nylon-6 composite and an additive with a weight ratio of 100:(0-5); then processing with high-speed melt spinning; and obtaining the high-strength high-modulus graphene/nylon-6 fiber; wherein:
the graphene/nylon-6 composite is prepared through steps of:
(1), adding modified graphene, a molecular weight modifier, and deionized water into a caprolactam melt, wherein a weight ratio of the modified graphene, the molecular weight modifier, the deionized water and the caprolactam melt is (0.1-0.5):(0.05-0.3):(1-10):100; stirring and uniformly mixing at 80° C. with 300-500 rpm, and forming a dispersion liquid; wherein: the modified graphene is single-layer graphene with carboxyl and hydroxyl on a surface; and a carbon-oxygen ratio is between 2.5 and 6; and

(2), under protection of nitrogen, increasing a temperature of the dispersion liquid to 250-270° C. in a polycondensation reactor, and reacting for 3 hours at 0.5-1 MPa; then reacting for 4 hours in a vacuum, and obtaining a polymer melt; processing the polymer melt with water-cooling granulation, and finally obtaining the graphene/nylon-6 composite.

2. The method for preparing the high-strength high-modulus graphene/nylon-6 fiber, as recited in claim 1, wherein the graphene has a transverse dimension larger than or equal to 3 μm.

3. The method for preparing the high-strength high-modulus graphene/nylon-6 fiber, as recited in claim 2, wherein the graphene has a transverse dimension between 3-10 μm.

4. The method for preparing the high-strength high-modulus graphene/nylon-6 fiber, as recited in claim 2, wherein: for high-speed melt spinning, a melt temperature is 250-320° C., a continuous spinning speed is 1000-4000 m/min, and a draft ratio is 4-6.

5. A method for preparing a graphene/nylon-6 fabric with a permanent far-infrared healthcare function, comprising steps of: weaving a graphene/nylon-6 composite fiber, wherein: the graphene/nylon-6 composite fiber is prepared through steps of:

(1), adding modified graphene and deionized water into a caprolactam melt, wherein a weight ratio of the modified graphene, the deionized water and the caprolactam melt is (0.01-0.5):(1-10):100; stirring and uniformly mixing at 80° C. with 300-500 rpm, and forming a dispersion liquid; wherein: the modified graphene is single-layer graphene with carboxyl and hydroxyl on a surface; and a carbon-oxygen ratio is between 3.0 and 6;

(2), under protection of nitrogen, increasing a temperature of the dispersion liquid to 250-270° C. in a polycondensation reactor, and reacting for 3 hours at 0.5-1 MPa; then reacting for 4 hours in a vacuum, and obtaining a polymer melt; processing the polymer melt with water-cooling granulation, and obtaining a graphene/nylon-6 composite; and (3), processing the graphene/nylon-6 composite and an additive with high-speed melt spinning, wherein: for high-speed melt spinning, a melt temperature is 250-320° C., a continuous spinning speed is 600-6000 m/min, a draft ratio is 1.5-4, and the obtained fiber has a diameter of 5-50 μm.

6. The method for preparing the graphene/nylon-6 fabric with the permanent far-infrared healthcare function, as recited in claim 5, wherein the graphene has a transverse dimension larger than 1 μm.

7. The method for preparing the graphene/nylon-6 fabric with the permanent far-infrared healthcare function, as recited in claim 5, wherein a carbon-oxygen ratio of the graphene is between 4.5 and 6.

\* \* \* \* \*